(12) United States Patent
David et al.

(10) Patent No.: US 8,029,220 B2
(45) Date of Patent: Oct. 4, 2011

(54) BLIND RIVET ASSEMBLY

(75) Inventors: Shalom David, Rishon Lezion (IL);
Danny Chesterman, Efrat (IL)

(73) Assignee: Self-Fix Metals Ltd., Kiryat Malachi (IL)

( * ) Notice: Subject to any disclaimer, the term of this patent is extended or adjusted under 35 U.S.C. 154(b) by 0 days.

(21) Appl. No.: 12/637,790

(22) Filed: Dec. 15, 2009

(65) Prior Publication Data

US 2010/0150681 A1    Jun. 17, 2010

(51) Int. Cl.
*F16B 13/04*    (2006.01)
(52) U.S. Cl. ............................................. 411/43; 411/34
(58) Field of Classification Search .................... 411/34, 411/43, 55, 69, 38, 54
See application file for complete search history.

(56) References Cited

U.S. PATENT DOCUMENTS

| | | | | |
|---|---|---|---|---|
| 3,369,289 | A * | 2/1968 | Gapp | 29/512 |
| 3,390,601 | A * | 7/1968 | Summerlin | 411/43 |
| 5,429,464 | A * | 7/1995 | Eshraghi | 411/43 |
| 5,569,006 | A * | 10/1996 | Alvarado et al. | 411/43 |
| 6,077,009 | A * | 6/2000 | Hazelman | 411/43 |
| 2003/0123947 | A1 * | 7/2003 | Eshraghi | 411/43 |

* cited by examiner

*Primary Examiner* — Gary Estremsky
(74) *Attorney, Agent, or Firm* — Dekel Patent Ltd; David Klein

(57) ABSTRACT

A blind rivet assembly for securing workpieces having aligned bores with the workpieces having an open surface at an open side and a blind surface at a blind side, the blind rivet assembly including a tubular shell having an enlarged shell head adapted to be in engagement with the open surface of the workpieces, a stem having an elongated shank with a stem head at the far end of the shank and having gripping means at the opposite end adapted to be gripped by an installation tool for application of an axial pulling force, and a placement ring having an near end and a far end, and having a pre-installation orientation and a post-installation orientation, wherein in the pre-installation orientation the placement ring is disposed around a ring receiving portion of the elongated shank, and the post-installation orientation is created by axially pulling the stem towards the open side of the workpieces with an axial pulling force that forces the placement ring into a through bore which causes the shell to deform outwards and form a blind head, and wherein upon continued axial pulling of the stem, the stem progressively moves into the shell until the stem encounters a stop shoulder, whereupon material of the stop shoulder is moved into a locking portion to arrest further movement of the stem, and whereupon increased axial force on the stem shears a portion of the stem on the open side at a shearable break-groove.

9 Claims, 4 Drawing Sheets

BLIND RIVET ASSEMBLY

FIELD OF THE INVENTION

The present invention relates generally to blind rivet assemblies, and particularly to a blind rivet which will operate in workpieces to be fastened together and will become radially expanded in order to provide hole fill and an interference fit with the surfaces of the openings of the workpieces upon final installation, and clamp the workpieces together.

BACKGROUND OF THE INVENTION

In securing workpieces together with a blind fastener, it is desirable to be able to maintain a high final clamp load on the workpieces. At the same time, it is desirable that the installed fastener has the capability of withstanding high shear loads. The magnitude of the clamp load is established by the relative axial force applied between the stem and shell when the blind head is formed and then engages the back surface of the workpiece. The magnitude of the shear load is primarily determined in this type of rivet by the mechanical strength of the stem, while the shear strength which can be attributed to the shell is normally less significant, and cannot be readily increased, since the shell must retain high ductility in order to be deformed during setting.

In order to achieve high shear strength, therefore, it is desirable to have a solid stem which will always shear flush with the head of the shell, and will guarantee a full plugging of the workpiece from the head of the shell on the one side, and to the blind (opposite) side of the workpiece. However, prior fasteners of this type have typically been limited in the width range of the workpieces they can fasten, since the principal engineering requirement to plug the entire workpiece in order to obtain high shear strength has not permitted the rivet to be used in multiple workpieces widths.

SUMMARY OF THE INVENTION

In the present invention, the above-described problem is solved by using a third component, which allows the stem to plug the workpiece and provide high shear strength, while at the same time allowing the rivet to be used in multiple applications and workpiece widths.

The first blind head is formed in the shell by a placement ring. The ring is assembled onto the stem shank, located under the stem head, and is moved into the blind end of the shell in response to an axial force applied to the stem by the installation tool. This force inserts the ring into the blind end of the shell, thereby deforming the shell and forming a blind head. This deformation engages the inner (rear) workpiece surface and initiates a clamping of the workpieces. As the axial force is increased, the ring is moved fully into the shell to further increase the clamp load, and the ring will progress into the shell until the point where it meets the rear side of the workpiece and cannot progress any further. Concurrently with, or subsequent to, the insertion of the ring inside the shell, the stem head is moved into the blind end of the shell and radially expands the shell further. The stem shank is moved to a final position where a lock is engaged to lock the stem and shell together, and at which position a break-groove on the stem is now in line with the shell head. At this pre-determined point, under an increased axial force applied by the tool, the stem will shear and installation is complete.

The placement ring, shell and stem are designed such that the rivet will allow a wide range of workpiece widths ("grip ranges") to be used using one fastener. At a minimum workpiece width, the stem head will remain either outside the ring altogether, or only enter it minimally. At a maximum width of the workpiece, the stem head will enter the ring quite deeply, typically entering more than ¾ of the length of the ring. Therefore, the placement ring is the component which allows the stem, with its break-groove at a given location, to always shear at the top of the shell head, thereby allowing the stem to fully plug the workpiece and provide high shear strength.

There is thus provided in accordance with an embodiment of the present invention a three piece blind rivet assembly which includes a tubular shell, a stem and a hollow placement ring. The rivet is designed to secure a variety of workpieces while forming a high strength fastening.

In accordance with a non-limiting embodiment of the present invention, the stem has a shank which extends through the tubular shell, and an enlarged head under which the hollow placement ring is initially located. A groove located in the stem accepts excess material from the shell which is displaced during the setting process and serves to lock the assembly in place. The stem shank can be gripped and pulled by an installation tool, and the movement of the stem will force the placement ring to move into the blind end of the tubular shell. This will form a blind head through deformation of the shell, for clamping workpieces together. As the axial force is increased, the stem head is then forced into the blind end of the shell, creating additional deformation of the shell, and the stem will shear at a pre-determined point which will be located adjacent to the head of the shell.

DETAILED DESCRIPTION

The following description of the blind rivet is exemplary in nature and in no way is intended to limit the invention or its applications.

Figure 1:
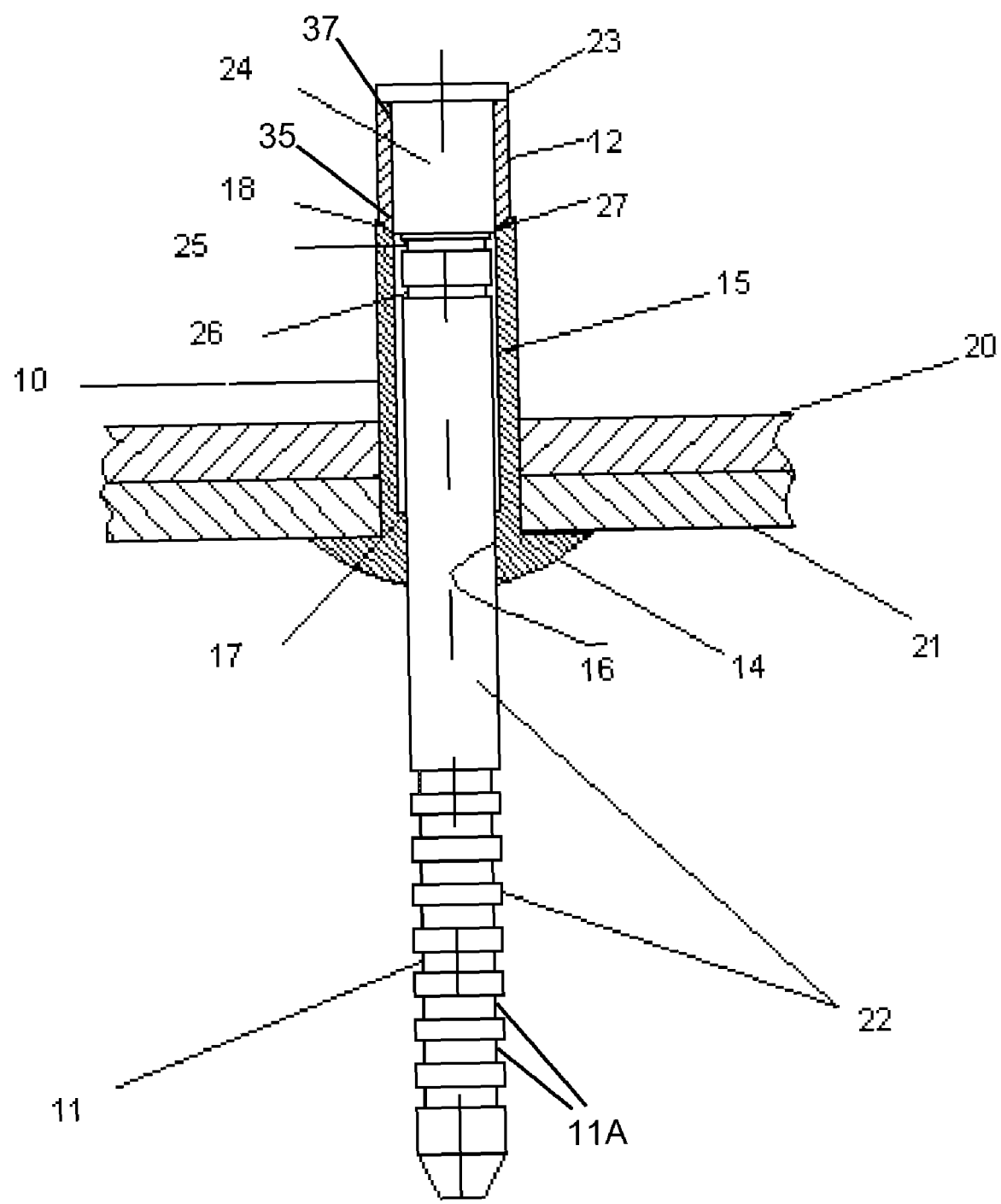
FIG. 1 is a side elevational view of a blind rivet assembly (or fastener assembly, the terms being used interchangeably), including a stem, shell and placement ring, and shown preassembled and prior to installation.

Referring to FIG. 1, a blind rivet is shown and includes a tubular shell 10, a stem 11 and a placement ring 12 in assembled condition, prior to installation. The rivet is shown placed in workpieces 20 and 21, which are to be fastened together.

Figure 2:
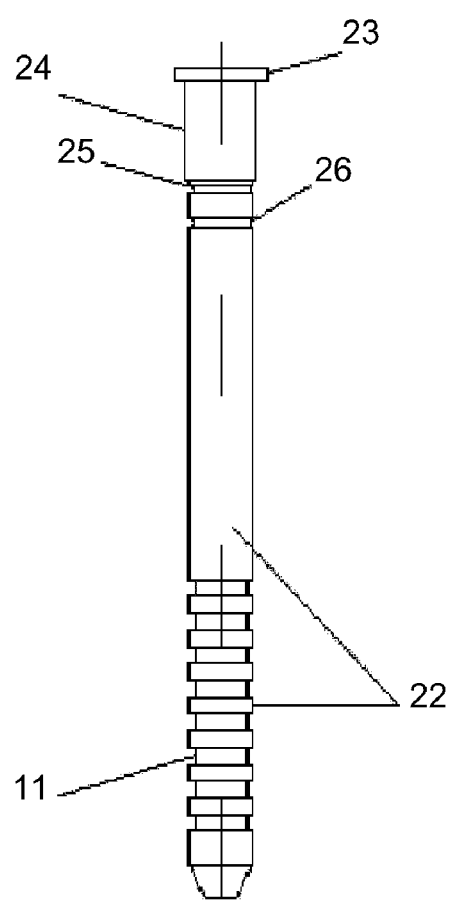
FIG. 2 is a side elevational view of the stem in FIG. 1
Figure 2A:
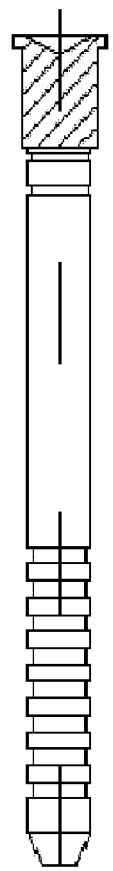
FIGS. 2A, 2B show additional versions of the stem.
Figure 2B:

Referring to FIG. 1 and FIG. 2, the stem 11 has an elongated shank 22 partly grooved, which terminates in an enlarged stem head 23. Under the head is a portion 24 of the shank upon which the placement ring is assembled. A lock-groove 25 and break-groove 26 are located at pre-determined locations. The lock-groove has a diameter designed to allow material from the shell 10 to flow inside the groove during installation, and the break-groove 26 is the weakest section of the stem and will shear at the conclusion of the installation. FIGS. 2A and 2B show other configurations for the stem, namely different head shapes and a bore in the stem head to allow the head to enter the placement ring easier. Other varieties of stem and other locking systems are possible.

Figure 3:
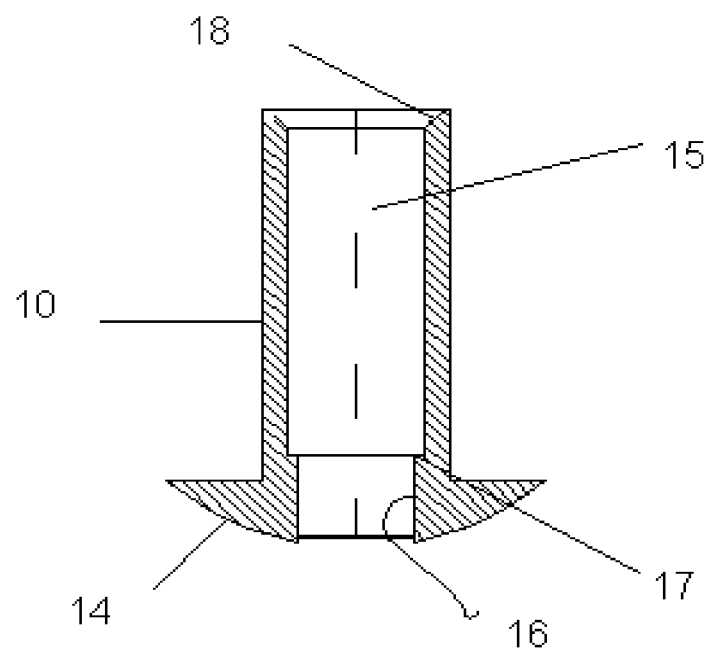
FIG. 3 is a side elevational view of the shell in FIG. 1

Referring to FIG. 1 and FIG. 3, the shell 10 has a shank of uniform diameter and an enlarged head 14. The shell has a through bore 15 in the shank, with a head bore 16 of a reduced diameter. A stop shoulder 17 is located at the juncture of the two bores 15 and 16. A countersunk chamfer 18 at the blind end of the shell allows the stem and ring to enter the shell with less force.

Figure 4:
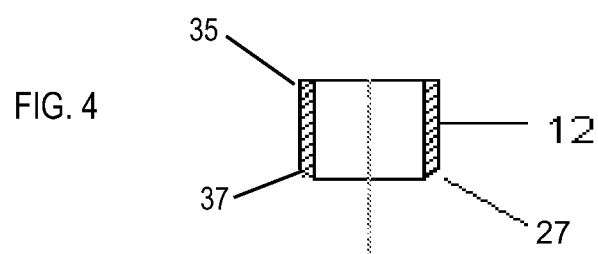
FIG. 4 is a side elevational view of the placement ring in FIG. 1
Figure 4A:
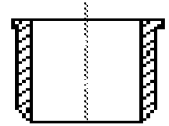
FIGS. 4A, 4B and 4C show additional versions of the placement ring.
Figure 4B:
Figure 4C:
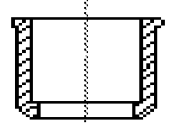

Referring to FIG. 1 and FIG. 4, the placement ring 12 is located under the stem head. Its outer diameter and bore are designed to sufficiently deform the shell 10 during installation, and to allow the stem 11 to move in the designed manner during installation at various workpiece widths. Placement ring 12 has a near end 35 and a far end 37. A chamfer 27 is located at the edge of the ring which will first enter the shell 10, that is, the near end 35, in order to allow easy entry. FIGS. 4A, 4B and 4C show other configurations for the placement ring, with the possibility of two bore sizes, an enlarged head, a version without chamfer 27 (FIG. 4B), and any combination of these or other versions which can be considered.

The rivet is designed to be set by standard rivet installation tools, wherein the tool engages gripping means, e.g., stem pull grooves 11A (FIG. 1), while an anvil engages the shell head 14, which is in contact with the outer workpiece 21. Upon using the tool, axial force is applied between the stem, shell and ring, to move the stem 11 and ring 12 into the shell 10.

Figure 5:
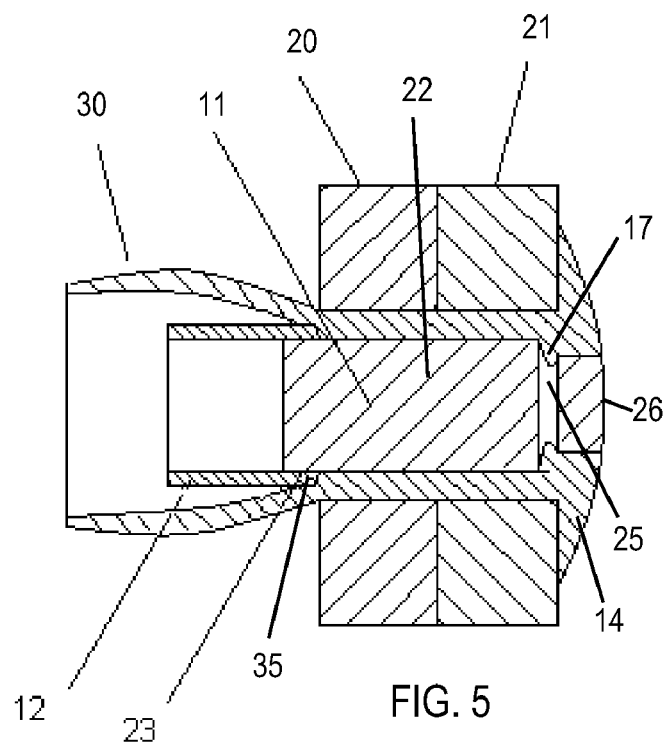
FIG. 5 is an elevational view of the rivet in FIG. 1, showing the rivet in its final installed form in the "minimum grip" orientation, securing workpieces of a minimum width.

When the axial force increases to a predetermined magnitude, the stem 11 starts moving, and ring 12 will be forced into the large diameter bore 15 of the shell 10, causing the shell shank in that area to deform outwards and form a blind head 30 (shown in FIG. 5).

The movement of the stem 11 and ring 12 continues until the placement ring 12 is located at a position proximate to the rear side of workpiece 20, and cannot progress any further due to shell 10 deforming outwards and forming a blind shoulder 33 that abuts against the blind side of the workpieces near the near end 35 of placement ring 12. The relative axial load applied to stem 11 and shell 10 clamps workpieces 20 and 21 together at a preselected amount of load. This movement of the ring 12 will cause some deformation thereof.

As the magnitude of axial force increases, the stem 11 progressively moves into the shell 10, and creates further deformation of the ring 12. This movement will continue until the stem 11 encounters the shell stop shoulder 17. At this point, the material of the shell stop shoulder 17 will be moved by the stem 11 into the stem lock-groove 25, after which further movement of the stem 11 will be stopped. Now, the amount of relative axial force will increase to a point at which the stem shank 22 will be sheared at the break-groove 26 and installation is complete. In another embodiment of the invention, having an alternative locking system between stem 11 and shell 10, the stem 11 has a "locking skirt" which is operated by a special nosepiece on the installation tool, and which provides the same desirable function of locking stem 11 and shell 10 together.

Figure 6:
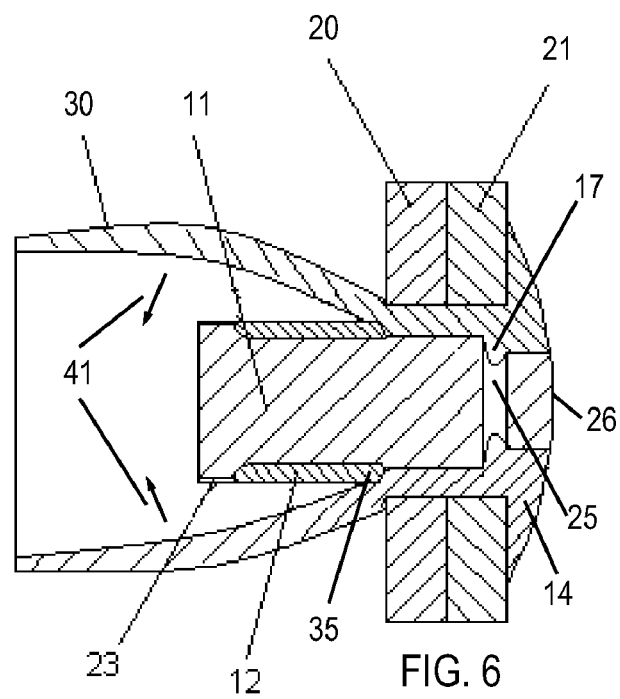
FIG. 6 is an elevational view of the rivet in FIG. 1, showing the rivet in its final installed form in the "maximum grip" orientation, securing workpieces of a maximum width.

FIG. 5 and FIG. 6 show the rivet in the final installed orientation, with FIG. 5 showing "minimum grip" (or workpiece width) orientation and FIG. 6 showing "maximum grip" (or workpiece width) orientation. Thus it can be seen that in minimum grip orientation (FIG. 5) the stem head 23 remains substantially outside the placement ring 12, while in maximum grip orientation (FIG. 6), stem head 23 has entered deeply into the ring 12, typically entering more than half the length of the ring 12. It is this large range of movement by the stem 11 inside the placement ring 12, which allows this rivet to be used in a wide variety of "grips" or workpiece widths. In this regard, the "grip range" of this blind rivet can be selectively varied by providing a longer or shorter shell 10, and/or a longer or shorter placement ring 12 in combination with a longer section of stem shank 24.

After installation, the close engagement between the placement ring 12 and the inner surface of the shell bore 15 provides additional resistance to stem push-out, while supporting clamp retention. In this regard, it should be noted that as the placement ring 12 moves into the shell bore 15, the expanded portion of the shell shank 30 will spring back to partially grip ring 12 (as indicated by arrows 41 in FIG. 6) and thereby enhance the strength of the clamp and lock of the installed rivet.

The invention can work with various metal types, including but not limited to aluminum, steel and stainless steel.

Another embodiment includes additional locking features, including various grooves which can be located on each of the three components, and which provide resistance to stem push-out.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A blind rivet assembly comprising:
   a tubular shell having an enlarged shell head and a blind head section, said tubular shell being formed with a through bore extending towards said enlarged shell head and with a head bore through said enlarged shell head of a diameter smaller than said through bore, wherein a stop shoulder is located at a juncture of said through bore and said head bore;
   a stem disposed in said through bore and said head bore, said stem having an elongated shank with a stem head at a blind end of said shank and having gripping means at an end, opposite to said blind end, adapted to be gripped by an installation tool, wherein proximate to said stem head is a ring receiving portion of said elongated shank and proximate to said ring receiving portion on said elongated shank is a locking portion and proximate to said locking portion on said elongated shank is a break-groove; and
   a placement ring having an near end and a far end, said placement ring being initially disposed around said ring receiving portion of said elongated shank,
   wherein said blind rivet assembly is adapted for securing workpieces having aligned bores with the workpieces having an open surface at an open side and a blind surface at a blind side, and said enlarged shell head is adapted to be in engagement with the open surface of the workpieces, said shell being adapted to extend through the workpiece bores and said blind head section being located at the blind surface of the workpieces, and said stem being adapted for being axially pulled towards the open side of the workpieces with an axial pulling force when said gripping means is pulled by the installation tool, said placement ring being adapted to be forced into said through bore and said shell being adapted to deform outwards and form a blind head when said axial pulling force is applied, said placement ring and said stem being adapted to move due to said axial pulling force until the near end of said placement ring is located at a position proximate to the blind side of the workpieces and said placement ring cannot progress any further due to said shell deforming outwards and forming a blind shoulder that abuts against the blind side of the workpieces near the near end of said placement ring, said placement ring remaining one continuous piece, and wherein upon continued axial pulling of said stem, said stem is adapted to progressively move into said shell until said stem encounters said stop shoulder, whereupon material of said stop shoulder is adapted to move into said locking portion to arrest further movement of said stem, and wherein a portion of said stem on the open side at said break-groove is adapted for breaking by increased axial pulling upon completing setting of said rivet assembly.

2. The blind rivet assembly according to claim 1, wherein said stem head is adapted to remain at least partially outside said placement ring upon completing setting of said rivet assembly.

3. The blind rivet assembly according to claim 1, wherein said stem head is adapted to enter at least half the length of said placement ring upon completing setting of said rivet assembly.

4. The blind rivet assembly according to claim 1, wherein said locking portion comprises a lock-groove formed on said elongated shank.

5. The blind rivet assembly according to claim 1, wherein an expanded portion of said shell is adapted to spring back to partially grip said placement ring upon completing setting of said rivet assembly.

6. The blind rivet assembly according to claim 1, wherein a countersunk chamfer is formed at a far end of said shell.

7. The blind rivet assembly according to claim 1, wherein the near end of said placement ring is chamfered.

8. The blind rivet assembly according to claim 1, wherein said stem head is adapted to enter completely into said placement ring upon completing setting of said rivet assembly.

9. A method for setting a blind rivet assembly comprising:
placing a blind rivet assembly through aligned bores of workpieces, the workpieces having an open surface at an open side and a blind surface at a blind side;
wherein said blind rivet assembly comprises:
a tubular shell having an enlarged shell head and a blind head section, said tubular shell being formed with a through bore extending towards said enlarged shell head and with a head bore through said enlarged shell head of a diameter smaller than said through bore, wherein a stop shoulder is located at a juncture of said through bore and said head bore;
a stem disposed in said through bore and said head bore, said stem having an elongated shank with a stem head at a blind end of said shank and having gripping means at an end, opposite to said blind end, adapted to be gripped by an installation tool, wherein proximate to said stem head is a ring receiving portion of said elongated shank and proximate to said ring receiving portion on said elongated shank is a locking portion and proximate to said locking portion on said elongated shank is a break-groove; and
a placement ring having an near end and a far end, said placement ring being initially disposed around said ring receiving portion of said elongated shank;
wherein said enlarged shell head is in engagement with the open surface of the workpieces, said shell extending through the workpiece bores and said blind head section being located at the blind surface of the workpieces;
axially pulling said stem towards the open side of the workpieces with an axial pulling force imparted by the installation tool gripping said gripping means, so that said placement ring is forced into said through bore and said shell deforms outwards and forms a blind head, said placement ring and said stem moving due to said axial pulling force until the near end of said placement ring is located at a position proximate to the blind side of the workpieces and said placement ring cannot progress any further due to said shell deforming outwards and forming a blind shoulder that abuts against the blind side of the workpieces near the near end of said placement ring, said placement ring remaining one continuous piece; and
continuing to axially pull said stem so that said stem progressively moves into said shell until said stem encounters said stop shoulder, whereupon material of said stop shoulder moves into said locking portion to arrest further movement of said stem, and wherein a portion of said stem on the open side at said break-groove breaks by increased axial pulling upon completing setting of said rivet assembly.

\* \* \* \* \*